US012592844B2

(12) United States Patent
Nandy et al.

(10) Patent No.: US 12,592,844 B2
(45) Date of Patent: Mar. 31, 2026

(54) OPTIMIZATION OF LINK BANDWIDTH CONSUMPTION IN A LAYER-2 MULTICAST NETWORK

(71) Applicant: Hewlett Packard Enterprise Development LP, Spring, TX (US)

(72) Inventors: Tathagata Nandy, Bangalore (IN); Subramanian Muthukumar, Bangalore (IN); Priyam De, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 18/473,938

(22) Filed: Sep. 25, 2023

(65) Prior Publication Data

US 2025/0106062 A1     Mar. 27, 2025

(51) Int. Cl.
H04L 12/18 (2006.01)
(52) U.S. Cl.
CPC .................................. H04L 12/185 (2013.01)
(58) Field of Classification Search
CPC .......................... H04L 12/1886; H04L 12/185
USPC ........................................................ 370/390
See application file for complete search history.

(56) References Cited

FOREIGN PATENT DOCUMENTS

KR        20150003394 A  *  1/2015  ........... H04L 12/185

OTHER PUBLICATIONS

Christensen et al., "Considerations for Internet Group Management Protocol (IGMP) and Multicast Listener Discovery (MLD) Snooping Switches", Network Working Group, Request for Comments: 4541, May 2006, 16 pages.

* cited by examiner

*Primary Examiner* — Sibte H Bukhari
(74) *Attorney, Agent, or Firm* — Yao Legal Services, Inc.

(57)        ABSTRACT

One aspect can provide a system and method for selective data forwarding in a multicast network. During operation, a querier router in the multicast network receives, at a first port of, a query-response packet from a network device in response to an all-host query sent by the querier router and add the first port to a port list comprising a number of ports coupled to non-querier devices in the multicast network. In response to receiving a multicast-join message, the querier router can forward the multicast-join message to the ports on the port list comprising the first port except for a port that receives the multicast-join message. Forwarding the multicast-join message to the first port causes the multicast-join message to be received at a second port of a layer-2 switch, which allows the layer-2 switch to forward unknown multicast data packets to the querier device via the second port.

16 Claims, 11 Drawing Sheets

OPTIMIZATION OF LINK BANDWIDTH CONSUMPTION IN A LAYER-2 MULTICAST NETWORK

BACKGROUND

Field

This disclosure is generally related to multicast networks. More specifically, this disclosure is related to optimizing bandwidth consumption on inter-switch links.

BRIEF DESCRIPTION OF THE FIGURES

FIG. 1 illustrates an environment which includes a computing system with FIG. 3 illustrates an example of a multicast network implementing selective traffic forwarding, according to one aspect of the instant application.

In the figures, like reference numerals refer to the same figure elements.

DETAILED DESCRIPTION

Figure 1:
FIG. 1 illustrates an example of a conventional multicast network implementing unconditional traffic flooding at layer-2 switches, according to prior art.

Multicast allows data to be sent from a single source to multiple destinations simultaneously. Multicast data is only sent once but can be received by multiple endpoints that have subscribed to a specific multicast group. Essentially, multicast distributes the stream of data to multiple recipients without creating separate streams for each destination. Multicast can conserve network bandwidth and reduce the overall network traffic. Multicast is commonly used for delivering streaming media, Internet Protocol television (IPTV), Voice over Internet Protocol (VoIP), and video conferencing. Compared with unicast communication, multicast communication requires specialized network hardware and protocols to function properly.

A multicast network implementing the Internet Group Management Protocol (IGMP) or the Multicast Listener Discovery (MLD) protocol can include a querier device (which can be a layer-3 router or a layer-2 switch) that periodically sends out general query messages, also known as All-Host-Query (AHQ) packets, on the attached network to collect multicast membership information. Any non-querier device (e.g., a layer-2 switch) with IGMP/MLD snooping enabled can receive the AHQ packets from the querier device. Upon receiving an AHQ packet, the layer-2 (L2) switch can record the port that receives the AHQ packet as a query-detected port (QDP). According to the IGMP/MLD protocol, each QDP is unconditionally added to the forwarding list in the L2 switch's multicast Forwarding Information Base (FIB) table. To ensure that client devices coupled to other L2 switches in the network can also receive unknown multicast data packets arriving at the L2 switch, these unknown multicast data packets will always be flooded to the switch's QDP. Moreover, a Protocol Independent Multicast (PIM)-enabled router is supposed to flood received multicast data traffic to other coupled PIM-enabled routers to allow client devices coupled to those routers to receive the multicast traffic. Although the abovementioned flooding at the switches/routers can prevent traffic loss, it can lead to unnecessary bandwidth consumption when there is no client requesting the multicast traffic from other L2 switches. When the multicast traffic arriving at the L2 switch includes high-bandwidth traffic (e.g., IPTV traffic with 4K resolution), the bandwidth consumed by the unconditional flooding can be significant and may cause oversubscription of the link between the L2 switch and the querier router, leading to packet loss. Similarly, if a PIM-enabled router is a designated router (DR), it will forward the multicast data to the rendezvous points (RP) router for distribution along a shared multicast tree. There is no need for the DR to flood the multicast data packets to other PIM-enabled routers. Like the link between the L2 switch and the querier router, the unconditional flooding of the traffic to other PIM-enabled routers may cause packet loss on links among the PIM-enabled routers.

To prevent unnecessary flooding, according to some aspects of the instant application, each L2 switch sends multicast data packets to a QDP if and only if there is a client device on the other side of the querier requesting the multicast data. To accomplish this goal, upon receiving, at the QDP of an L2 switch, an AHQ packet from the querier, the L2 switch can respond with a query-response packet, causing the querier to add its port receiving the query-response packet to a first port list, with each port in the first port list coupled to a non-querier device. Similarly, PIM-enabled devices (e.g., L3 routers) in the network can snoop PIM Hello messages to allow the querier to add a port receiving the PIM Hello message to a second port list, with each port in the second port list being coupled to a PIM-enabled L3 router. The querier can forward each received join or leave message toward the ports on the first port list (i.e., ports that receive the query-response packets) such that each L2 switch sending the query-response packet can receive the join/leave message on its QDP. Therefore, when an L2 switch receives unknown multicast data packets, instead of unconditionally flooding the multicast data packets to the QDP, the L2 switch can determine whether a join message is received at the QDP. If a join message is received at the QDP, it means that at least a client device on the other side of the querier is requesting the multicast data, and the L2 switch will in turn forward the data packets to the QDP to allow the requesting client to receive the data. On the other hand, if the QDP does not receive any join, it means that there is no client device on the other side of the querier requesting the data. Accordingly, the L2 switch can suppress the flooding of the data packets to the QDP (i.e., it does not forward the data packets to the QDP as required by the IGMP protocol) to reduce bandwidth consumption on the link between the L2 switch and the querier. More specifically, the FIB-management logic can be configured to remove (or flag as being inactive) the QDP from the forwarding list. Similarly, when a PIM-enabled router receives multicast data packets, instead of unconditionally flooding the multicast data packets to its PIM-router-detected ports in all circumstances, the PIM-enabled router will forward the multicast data packets to the PIM-router-detected ports if and only if the router itself is not a DR router in the virtual local area network (VLAN). A non-DR router forwarding the multicast traffic to other routers can ensure that the DR router can receive the multicast traffic to register with the RP.

FIG. 1 illustrates an example of a conventional multicast network implementing unconditional flooding at layer-2 switches, according to prior art. In FIG. 1, a multicast network 100 can include a querier router 102, a number of L2 switches (e.g., switches 104 and 106) coupled to querier router 102, a multicast source server 108, and a number of client devices (e.g., client devices 110 and 112). Multicast source server 108 is the sender of multicast data packets, and client devices 110 and 112 are the receiver of the multicast data packets. For example, multicast source server 108. can be an IPTV server, client device 110 can be a laptop computer, and client device 112 can be a smart TV.

A multicast source server or a client device can be coupled to any switching or routing device to gain access to the network. In this example, multicast source server 108 and client device 110 can be coupled to L2 switch 104, and client device 112 can be coupled to L2 switch 106. It is also possible that a source server or client device is directly coupled to the querier in the network.

The hosts (e.g., source server 108 or client device 112), switches (e.g., switches 104 and 106) and routers (e.g., querier router 102) in multicast network 100 can use IGMP to establish multicast group memberships. More specifically, a switch can use IGMP snooping to listen in on the IGMP conversations between hosts and routers and maintain a map of which links need which IP multicast transmission. According to IGMP, querier router 102 can periodically send out All-Host Queriers (or AHQs) to coupled devices, as indicated by arrows 114 and 116. In FIG. 1, L2 switches 104 and 106 are non-querier devices and have enabled IGMP snooping. Accordingly, they will receive the AHQ packets and record the port receiving the AHQ packets as a querier-detected port (QDP). Each L2 switch can also unconditionally add the QDP to the forwarding list in the L2 multicast FIB table.

Adding the QDP to the forwarding list means that unknown multicast traffic arriving at the L2 switch will be forwarded to the QDP. Note that multicast data packets are considered unknown when there is no corresponding forwarding entry in the multicast forwarding table. In the example shown in FIG. 1, L2 switch 104 receives unknown multicast data packets from source server 108 and, accordingly, floods these packets to its QDP port (i.e., the port coupled to querier router 102). The QDP port in turn can forward these unknown multicast data (MDATA) packets to querier router 102 (as indicated by arrow 118). Such forwarding can be necessary if client device 112 on the other side of querier router 102 is requesting the multicast data packets (e.g., by sending a multicast join message (not shown in FIG. 1) to querier router 102 via L2 switch 106). The join message can specify a multicast group corresponding to the multicast data packets. In response to receiving the join message, querier router 102 can forward the received multicast data packets to client device 112 via L2 switch 106. The data forwarding path can be indicated by dashed arrows 120 and 122. However, if client device 112 is not requesting the multicast data packets, flooding these packets to the QDP of L2 switch 104 becomes unnecessary and wasteful of bandwidth. Note that if client device 110 is requesting the multicast data packets, it can send a join message (not shown in FIG. 1) to L2 switch 104, which can directly forward the multicast data packets to client device 110, as indicated by dashed arrow 124.

Eliminating the unnecessary flooding of multicast data packets on the link between L2 switch 104 and querier router 102 can reduce bandwidth consumption on that link. More specifically, the conventional forwarding behavior of L2 switch 104 can be modified such that it should flood multicast data packets to its QDP if and only if a client device on the other side of querier router 102 (e.g., client device 112) is requesting the multicast data packets. To achieve this goal, L2 switch 104 needs to know whether there is a client device requesting the multicast data packets on the other side of querier router 102.

Per IGMP, the querier router receives join messages from client devices and forwards corresponding multicast data packets to the requesting client devices. The querier router typically does not forward the join messages to L2 switches on the multicast path. According to one aspect of the instant application, the behavior of a conventional querier router can be modified to forward the join messages to L2 switches, thus allowing each L2 switch to find out whether a client device on the other side of the querier router is requesting multicast data for a particular group. Note that the querier router does not need to flood the join messages to all its ports. According to one aspect, the querier router only needs to forward the join messages to ports that are coupled to the QDP of IGMP-enabled L2 switches. In one example, the querier router can keep a list of ports that are coupled to the IGMP-enabled L2 switches. Such a port list can be referred to as a QDP-coupled port list. More specifically, the querier router can record a port as being coupled to an IGMP-enabled L2 switch if an AHQ-response packet is received at that port. The IGMP standard does not require the L2 switch to respond to the AHQ. According to one aspect, the behavior of each IGMP-enabled L2 switch can also be modified such that the switch can send an AHQ-response (AHQ-R) packet to the querier router in response to receiving an AHQ packet. Each time the querier router receives a join message, it can then forward the join message to all ports on the QDP-coupled port list except for the port that receives the join message. This way, the IGMP-enabled switches coupled to the querier router can receive the join message and determine whether there are client devices on the other side of the querier router requesting multicast data of a particular group.

Figure 2A:
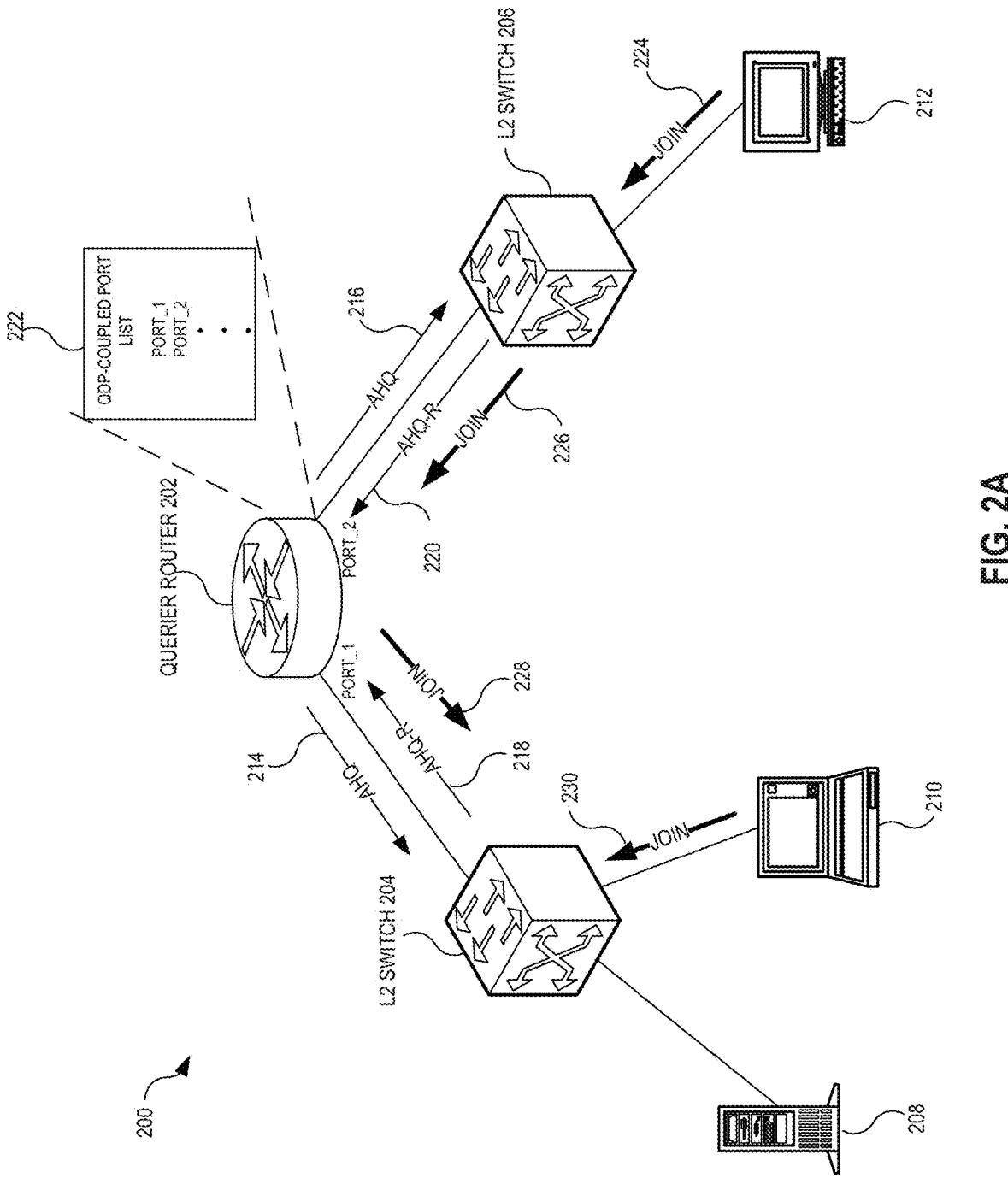
FIG. 2A illustrates an example of a querier router forwarding join messages, according to one aspect of the instant application.

FIG. 2A illustrates an example of a querier router forwarding join messages, according to one aspect of the instant application. In FIG. 2A, a multicast network 200 can include a querier router 202, L2 switches 204 and 206, a source server 208, and client devices 210 and 212. Source server 208 and client device 210 are coupled to L2 switch 204, and client device 212 is coupled to L2 switch 206.

Figure 2B:
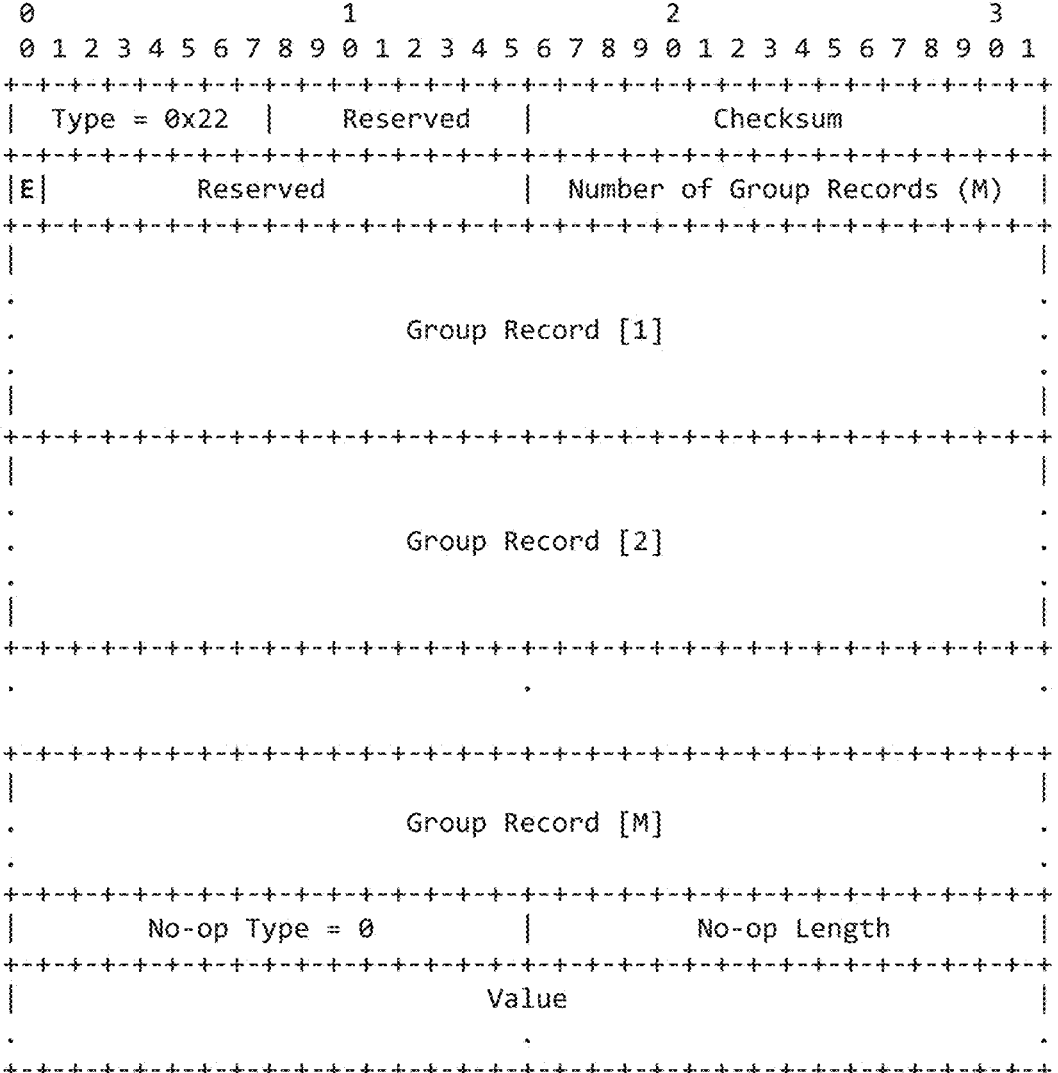
FIG. 2B illustrates an example of an All-Host-Query Response (AHQ-R) packet, according to one aspect of the instant application.

Querier router 202 can periodically send out AHQ packets to network 200, as indicated by arrows 214 and 216. IGMP-enabled L2 switches 204 and 206 can each respond to the AHQ packets with a corresponding AHQ-response (AHQ-R) packet, as indicated by arrows 218 and 220. According to some aspects, instead of a new packet format, the AHQ-R packet can be similar to a multicast join packet (also known as an IGMP membership report packet). Note that, in a conventional multicast network implementing IGMP, the join packet can be sent by multicast receivers (e.g., client devices 210 and 212) desired to join a multicast group. Like the join packet, the IGMP packet type of the AHQ-R packet can be set as 0X22. A typical join packet can include a number of type-length-value (TLV)-encoded group records, with each group record corresponding to a multicast IP address (e.g., a group address). Because the AHQ-R packet is sent by the L2 switch and is not used to join a multicast group, the type field of the group record can be set as zero, indicating no operation (no-op). The length field is also set as no-op, and the value field can be empty. FIG. 2B illustrates an example of an All-Host-Query Response (AHQ-R) packet, according to one aspect of the instant application. As can be seen in FIG. 2B, the AHQ-R packet can include a modified IGMP membership response packet, in which the type and length fields of each group record are set as no-op, and the value field is empty.

Returning to FIG. 2A, upon receiving the AHQ-R packets from L2 switches 204 and 206, querier router 202 can add the ports receiving those AHQ-R packets to a port list 222. More specifically, port list 222 can specify a set of ports that are coupled to the QDPs of IGMP-enabled devices. In this example, port_1 and port_2 of querier router 202 can be included in port list 222.

Client device 212 can send a join message to network 200. The join message can be forwarded to querier router 202 by L2 switch 206, as indicated by arrows 224 and 226. Upon receiving the join message, querier route 202 may check port list 222 to identify ports that are coupled to other IGMP-enabled devices and forward the join message to the ports on port list 222. Although port_2 is on port list 222, it is also the port that receives the join message. To avoid loops, the join message will not be forwarded back to port_2. Accordingly, querier router 202 can copy the join message to port_1, which can then forward the join message to L2 switch 204, as indicated by arrow 228. Client device 210 may also send a join message to L2 switch 204, as indicated by arrow 230. L2 switch 204 does not need to forward this join message to querier route 202 as it recognizes, based on the group address (or group ID) included in the join message, that the source server for the multicast group is a local server.

An IGMP-enabled device (e.g., L2 switch 204 or 206) may receive join messages for different multicast groups. Depending on whether a join message for a particular group is received at the QDP, the device can selectively forward the multicast data packets to the QDP. For example, an L2 switch may receive multicast data packets for groups G1 and G2 and may also receive, at the QDP, a join message for group G1 but does not receive any join message for group G2. Accordingly, the L2 switch can forward the multicast data packets for group G1 to the QDP but would suppress the flooding of the multicast data packets for group G2.

Figure 3:
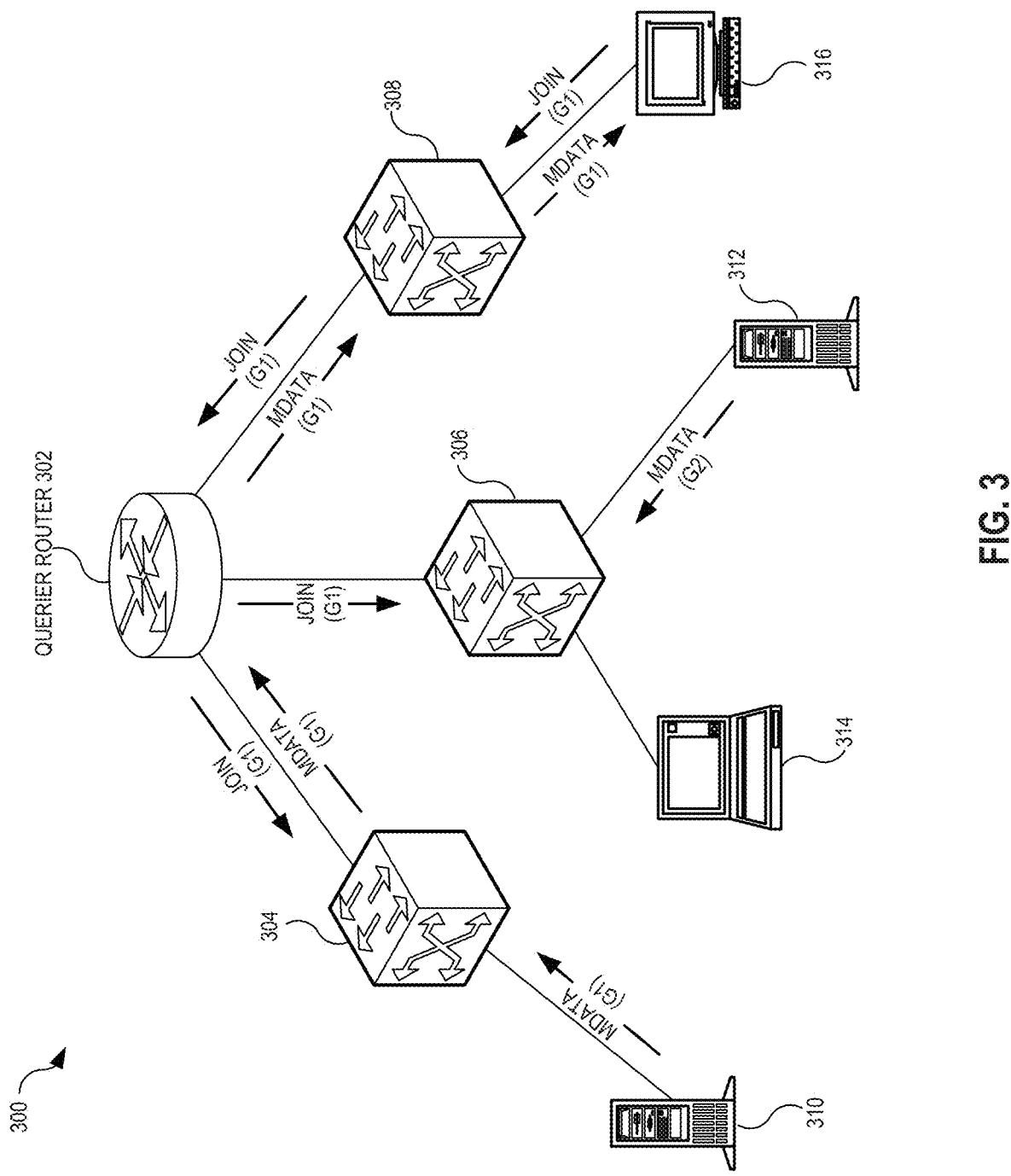

FIG. 3 illustrates an example of a multicast network implementing selective traffic forwarding, according to one aspect of the instant application. In FIG. 3, a multicast network 300 includes a querier router 302; IGMP-enabled L2 switches 304, 306, and 308; source servers 310 and 312; and client devices 314 and 316. L2 switches 304, 306, and

308 are coupled to querier router 302, source server 310 is coupled to L2 switch 304, source server 312 and client device 314 are coupled to L2 switch 306, and client device 316 is coupled to L2 switch 308.

In the example shown in FIG. 3, source server 310 transmits multicast data packets for a multicast group G1 to L2 switch 304, and source server 312 transmits multicast data packets for a multicast group G2 to L2 switch 306. Querier router 302 can determine that its ports coupled to switches 304, 306, and 308 are QDP-coupled ports and forward any received join messages to these ports. FIG. 3 also shows that client device 316 transmits a join message for group G1, indicating that client device 316 is requesting multicast traffic specific to multicast group G1. The join message can be forwarded to querier router 302 by L2 switch 308. Based on the port list specifying the QDP-coupled ports, querier router 302 can forward the join message to L2 switches 304, 306, and 308.

Based on the join message (which is specific to group G1), L2 switch 304 can allow the flooding of the multicast data packets for group G1 to its QDP, which in turn can deliver the multicast data packets to querier router 302. Subsequently, querier router 302 can forward the multicast data packets to client device 316 via L2 switch 308. On the other hand, L2 switch 306 determines that no join message for group G2 is received at its QDP and will consequently suppress the flooding of the multicast data packets for group G2 to its QDP coupled to querier router 302, thus eliminating the unnecessary bandwidth consumption on the link between L2 switch 306 and querier router 302.

FIG. 3 also shows that client device 314 sends a join message for group G2 to L2 switch 306, which can identify the multicast source (i.e., source server 312) and forward the multicast data packets to client device 314.

Figure 4:
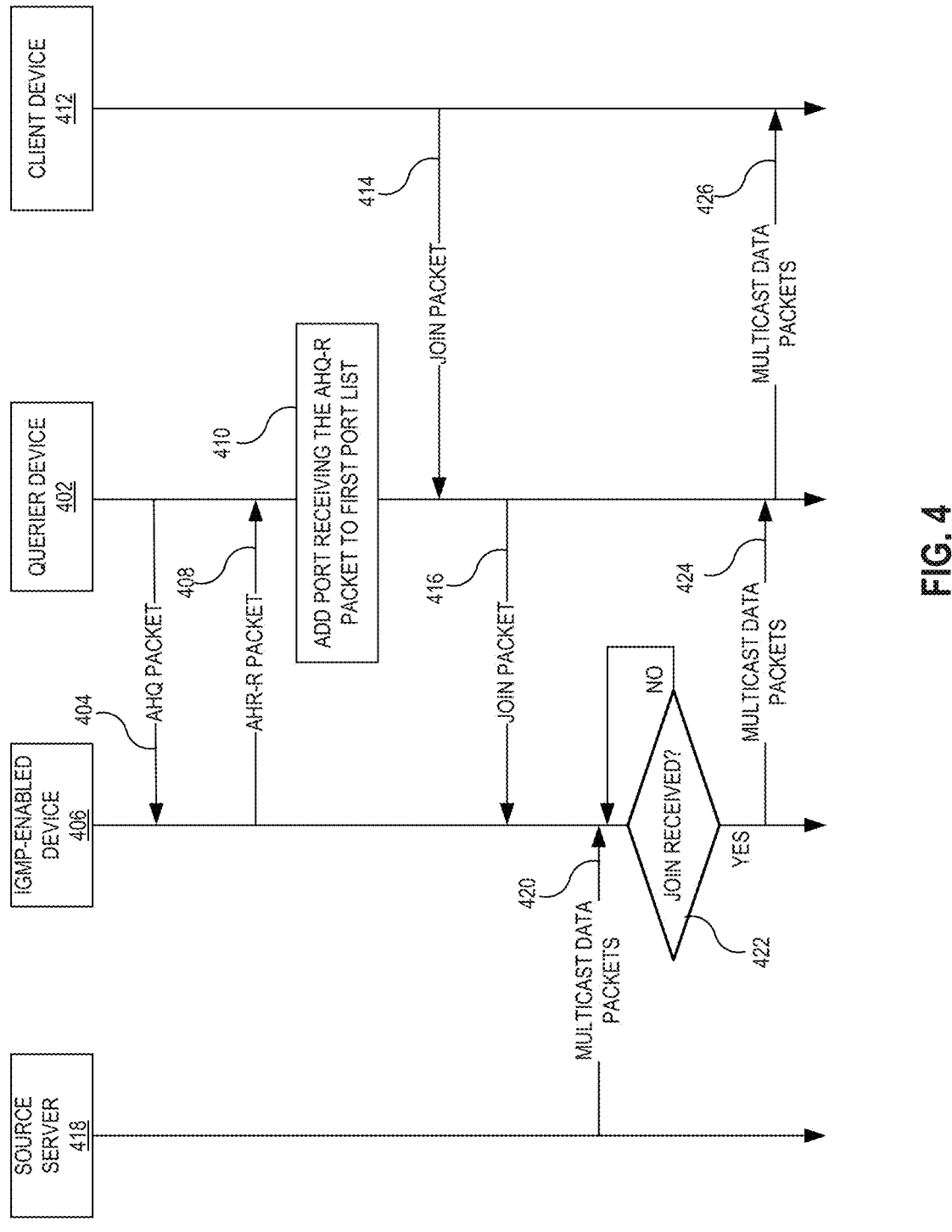
FIG. 4 illustrates an example of a process for delivering multicast data packets, according to one aspect of the instant application.

FIG. 4 illustrates an example of a process for delivering multicast data packets, according to one aspect of the instant application. During operation, a querier device 402 can broadcast an AHQ packet to the network that includes an IGMP-enabled device 406 (operation 404). Querier device 402 can be an L3 router or an L2 switch. IGMP-enabled device 406 can be an L2 switch, such as an access switch. In response to receiving the AHQ packet, L2 switch 406 can send an AHQ-R packet to querier device 402 (operation 408). Responsive to receiving the AHQ-R packet, querier device 402 can add the port that receives the AHQ-R packet to a first port list, the first port list specifying a set of ports that are coupled to IGMP-enabled devices (operation 410).

A client device 412 can send a multicast join packet (also known as an IGMP membership report packet) specifying a particular multicast group to querier device 402 (operation 414). Upon receiving the join packet, querier device 402 can forward the packet to all ports (except for the port receiving the join) on the first port list, causing the join packet to arrive at the QDP of IGMP-enabled device 406 (operation 416).

A source server 418 can send multicast data packets for the particular multicast group to IGMP-enabled device 406 (operation 420). Upon receiving the multicast data packets, IGMP-enabled device 406 can determine whether a join packet for the particular multicast group has been received on its QDP (operation 422). More specifically, a join-tracking logic unit in IGMP-enabled device 406 can track the multicast groups of all received join packets and compare the multicast group ID in the received multicast data packets with the multicast groups of the received join packets. If a match is found, meaning that a join packet for that particular multicast group has been received, IGMP-enabled device 406 can forward the multicast data packets to querier device 402 via the QDP (operation 424). Otherwise, no such forwarding will occur, and IGMP-enabled device 406 can suppress the flooding of the multicast data packets on its QDP. According to one aspect, the FIB-management logic of IGMP-enabled device 406 can be configured to remove (or flag as being inactive) the QDP from forwarding list. Note that per IGMP protocol, the QDP has been added to the forwarding list when IGMP-enabled device 406 receives the AHQ. Querier device 402 can subsequently forward the multicast data packets to client device 412 (operation 426).

According to some aspects of the instant application, when a querier device receives unknown multicast data packets, it may forward such packets to other PIM-enabled routers if and only if the querier device is not a designated router (DR) in the VLAN. To do so, each IGMP-enabled device, including the PIM-enabled routers, can snoop on the PIM advertising or Hello messages, which are periodically exchanged by PIM-enabled routers. Snooping on the PIM Hello messages allows the querier device to learn a list of ports that are coupled to other PIM-enabled routers. More specifically, for each port that receives a PIM Hello message, the querier device can add that port to a second port list that specifies a set of ports coupled to other PIM-enabled routers. Forwarding unknown multicast data packets to other PIM-enabled routers can allow the DR in the VLAN to receive such data packets and send a register message to the RP. On the other hand, if the querier device is already a DR, upon receiving the data packets, it can directly send a register message to the RP. There is no need to forward these packets to other PIM-enabled routers. More specifically, a DR router can remove the ports on the second list (i.e., the PIM-coupled ports) from its forwarding list.

Figure 5A:
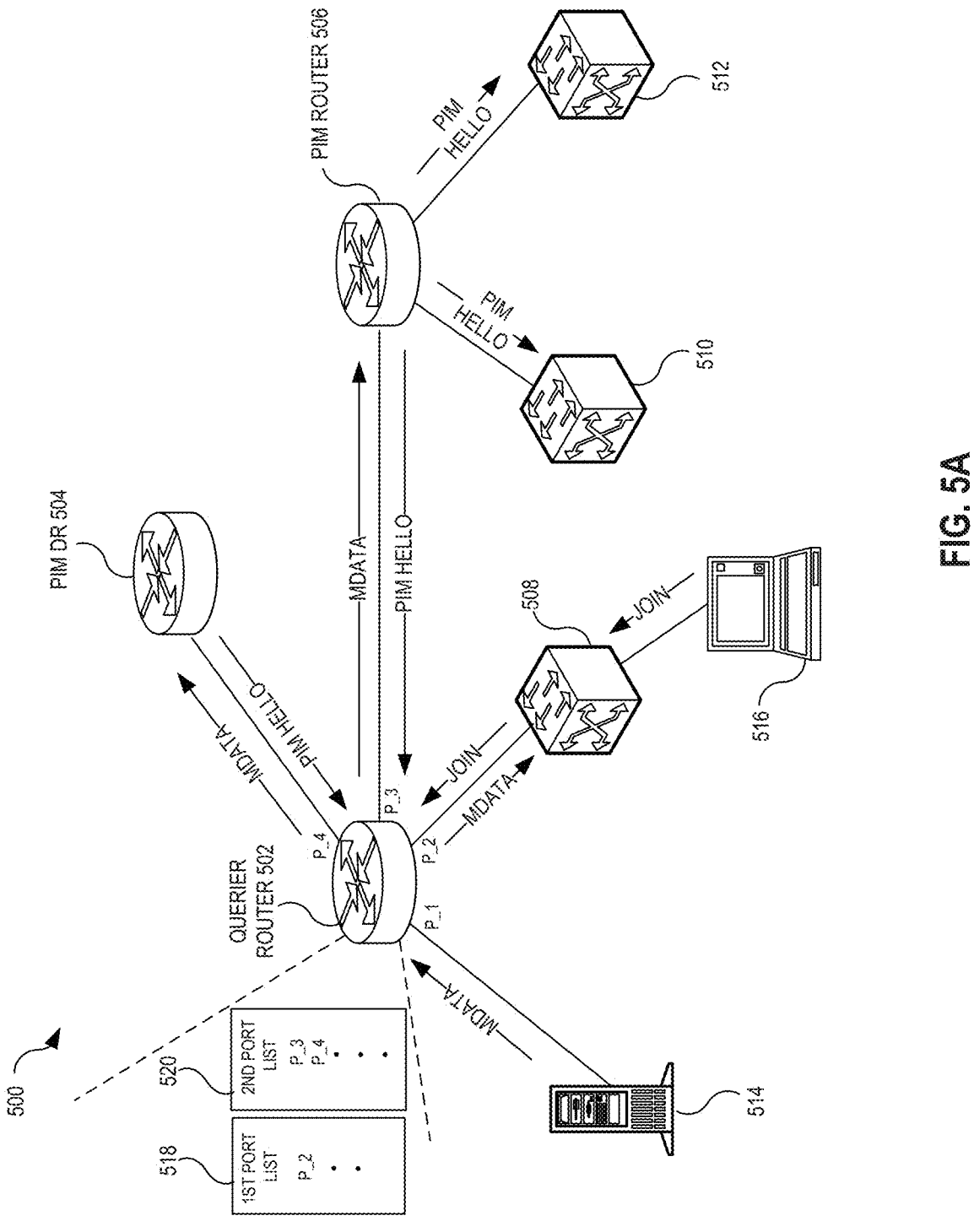
FIG. 5A illustrates an example of a multicast network where the querier is not a designated router, according to one aspect of the instant application.

FIG. 5A illustrates an example of a multicast network where the querier is not a designated router, according to one aspect of the instant application. In FIG. 5A, a multicast network 500 includes a number of L3 routers, including a querier router 502, a non-querier PIM DR 504, and a non-querier, non-DR PIM router 506. Both PIM DR 504 and PIM router 506 are coupled to querier router 502. Network 500 also includes IGMP-enabled L2 switches 508, 510, and 512; a source server 514; and a client device 516. L2 switch 508 is coupled to querier router 502, and L2 switches 510 and 512 are coupled to PIM router 506. Source server 514 is coupled to querier router 502, and client device 516 is coupled to L2 switch 508.

In the example shown in FIG. 5, querier router 502 can snoop on PIM Hello messages received from PIM DR 504 and PIM router 506, respectively, on ports P_4 and P_3. Accordingly, querier router 502 can add ports P_3 and P_4 to a second port list 520, which specifies ports coupled to other PIM-enabled routers. Querier router 502 also maintains a first port list 518 specifying which ports receive AHQ-R packets. In this example, first port list 518 includes a port P_2, which is coupled to L2 switch 508.

When querier router 502 receives a join message from L2 switch 508, it can check first port list 518, which includes port P_2. However, because P_2 is also the port receiving the join message, the join is not forwarded back to P_2. When querier router 502 receives multicast data packets from source server 514, it can check second port list 520 to determine that ports P_3 and P_4 are coupled to other PIM routers. Accordingly, querier router 502 can forward the multicast data packets to ports P_3 and P_4, causing those data packets to arrive at PIM DR 504 and PIM router 506. Upon receiving these data packets, PIM DR 504 can send a register message on behalf of source server 514 to the RP, such that subsequent multicast data packets from source server 514 can be correctly routed to receivers. Querier router 502 can also forward the multicast data packets to L2 switch 508 based on the join message.

Figure 5B:
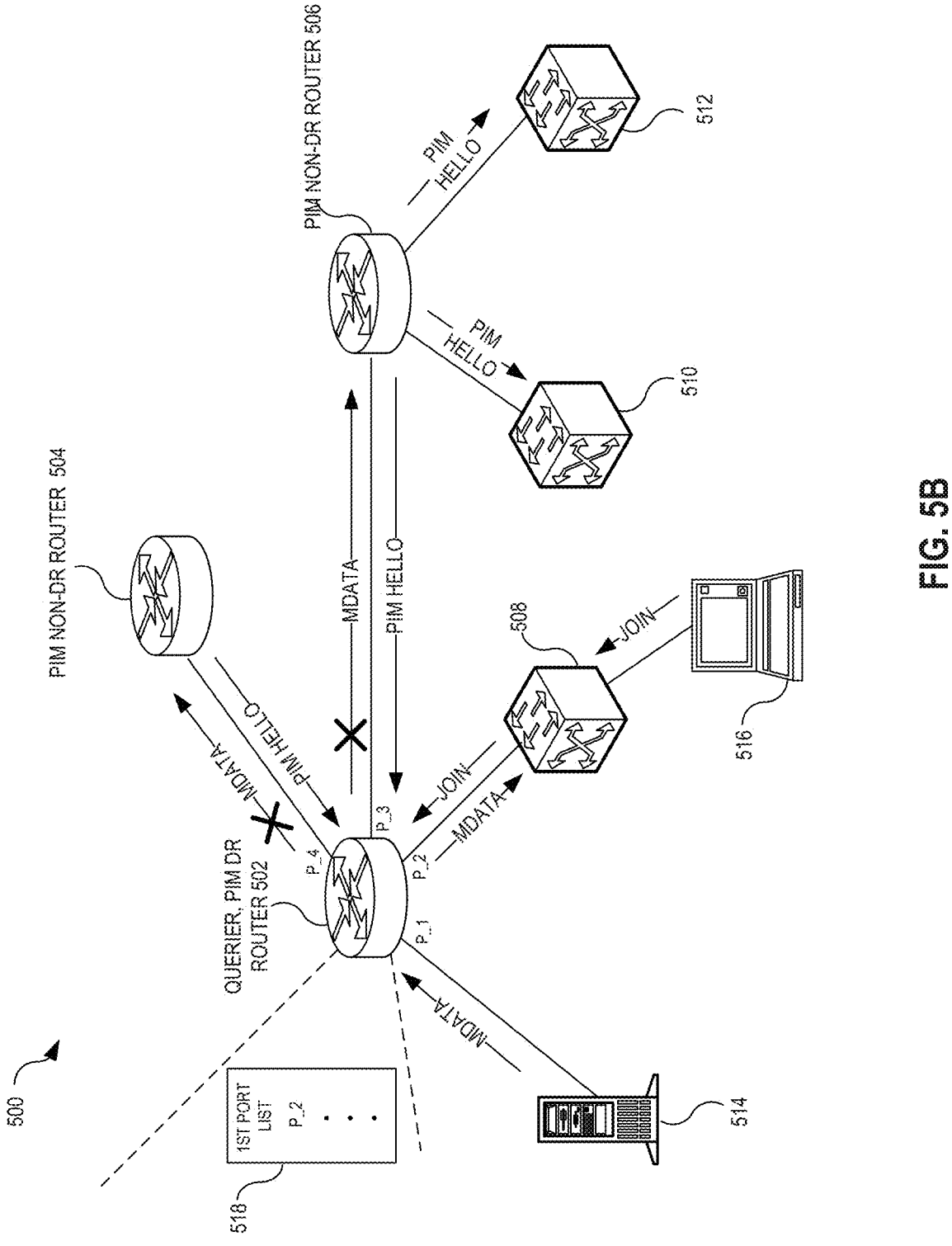
FIG. 5B illustrates an example of a multicast network where the querier is a designated router, according to one aspect of the instant application.

FIG. 5B illustrates an example of a multicast network where the querier is a designated router, according to one aspect of the instant application. The multicast network shown in FIG. 5B is similar to the multicast network shown in FIG. 5A, except that in the example shown in FIG. 5B querier router 502 is also a PIM DR router, whereas PIM router 504 is a non-DR router. The routers continue to exchange PIM Hello messages. However, as a DR, querier router 502 no longer needs to maintain the second port list that identifies which ports are coupled to other PIM routers. Moreover, when router 502 receives unknown multicast data packets from source server 514, it no longer needs to forward those data packets to other PIM routers. Eliminating such data forwarding can reduce the bandwidth consumption on the links between router 502 and routers 504 and 506. Router 502 continues to forward the multicast data packets to L2 switch 508 responsive to the join message.

Figure 6A:
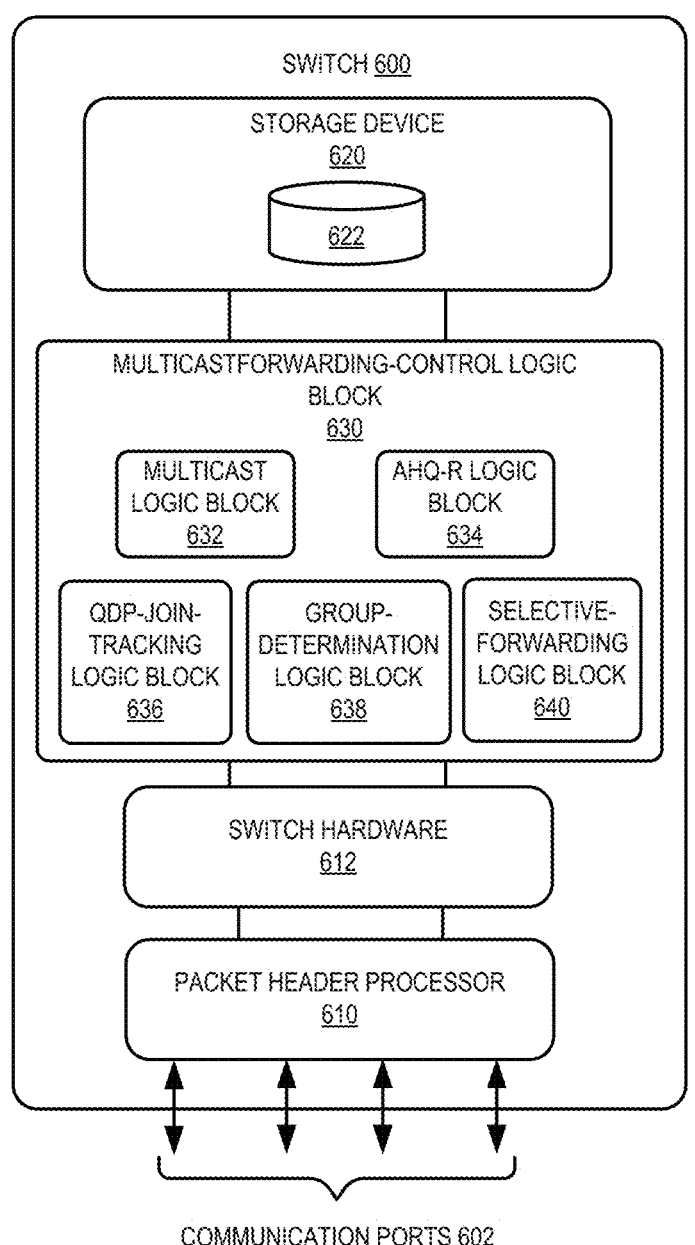
FIG. 6A illustrates an example of a switch implementing selective multicast traffic forwarding, according to one aspect of the present application.

FIG. 6A illustrates an example of a switch implementing selective multicast traffic forwarding, according to one aspect of the present application. In this example, a switch 600 can include a number of communication ports 602, a packet header processor 610, and a storage device 620. Switch 600 can also include switch hardware 612 (e.g., processing hardware of switch 600, such as its application-specific integrated circuit (ASIC) chips), which includes information based on which switch 600 processes packets (e.g., determines output ports for packets). Packet header processor 610 can perform the standard packet-processing function by extracting and processing header information from the received packets. Packet header processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet header processor 610 can process Ethernet frames and/or IP packets. A respective port of communication ports 602 may operate as an ingress port and/or an egress port.

Switch 600 can maintain a database 622 (e.g., in storage device 620). Database 622 can be a relational database and may run on one or more Database Management System (DBMS) instances. Database 622 can store information associated with the routing, configuration, and interfaces of switch 600. Switch 600 can include a multicast-forwarding-control logic block 630 that can allow switch 600 to selectively forward multicast traffic to its ports.

Multicast-forwarding-control logic block 630 can include a multicast logic block 632, an AHQ-R logic block 634, a QDP-join-message-receiving logic block 636, a group-determination logic block 638, and a traffic-forwarding logic block 640. Multicast logic block 632 can perform standard multicast functions, such as receiving and forwarding AHQ packets and tracking multicast join messages received from client devices. AHQ-R logic block 634 can generate and send an AHQ-R packet to the querier. QDP-join-tracking logic block 636 can track a join message received at the QDP from the querier. Determination logic block 638 can determine whether a join message for a particular group is received at the QDP from the querier. Selective-forwarding logic block 640 can selectively forward multicast traffic to the QDP of switch 600. Multicast traffic for a particular group is forwarded to the QDP if and only if a join packet for the group is received at the QDP.

Figure 6B:
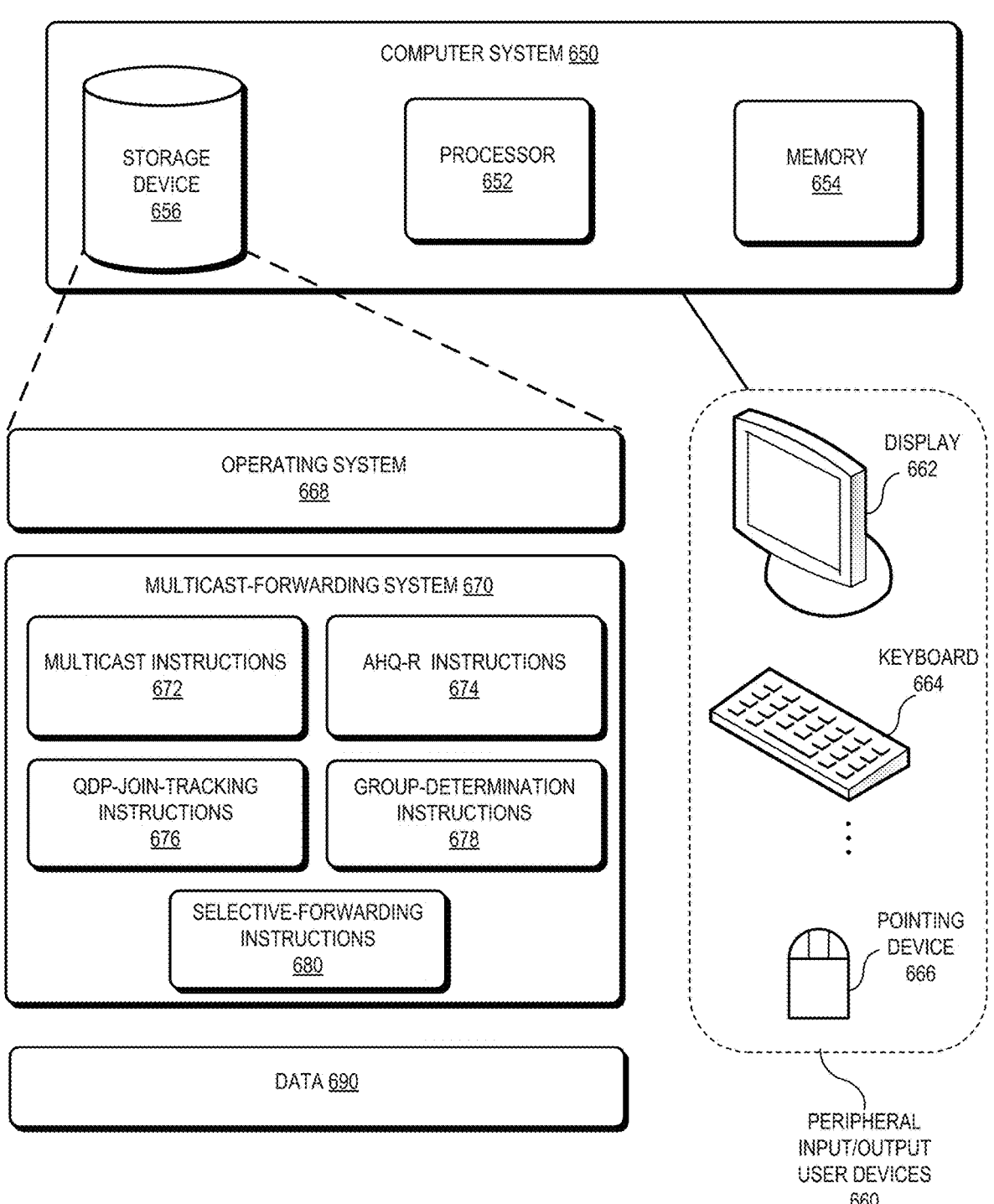
FIG. 6B illustrates an example of a computer system implemented on a layer-2 switch to facilitate selective multicast traffic forwarding, according to one aspect of the instant application.

FIG. 6B illustrates an example of a computer system implemented on a layer-2 switch to facilitate selective multicast traffic forwarding, according to one aspect of the instant application. Computer system 650 can include a processor 652, a memory 654, and a storage device 656. Furthermore, computer system 650 can be coupled to peripheral input/output (I/O) user devices 660, e.g., a display device 662, a keyboard 664, and a pointing device 666. Storage device 656 can store an operating system 668, a multicast-forwarding system 670, and data 690.

Multicast-forwarding system 670 can include instructions, which when executed by computer system 650, can cause computer system 650 or processor 652 to perform methods and/or processes described in this disclosure. Multicast-forwarding system 670 can include instructions for performing standard multicast operations (multicast instructions 672), instructions for generating and sending AHQ-R packets (AHQ-R instructions 674), instructions for receiving and tracking join messages received at the QDP from the querier device (QDP-join-tracking instructions 676), instructions for determining whether a join message for a particular multicast group is received at the QDP (group-determination instructions 678), and instructions for selectively forwarding multicast data packets for different groups (selective-forwarding instructions 680). Multicast data packets associated with a group can be forwarded to the querier in response to a corresponding join message being received at the QDP.

Figure 7A:
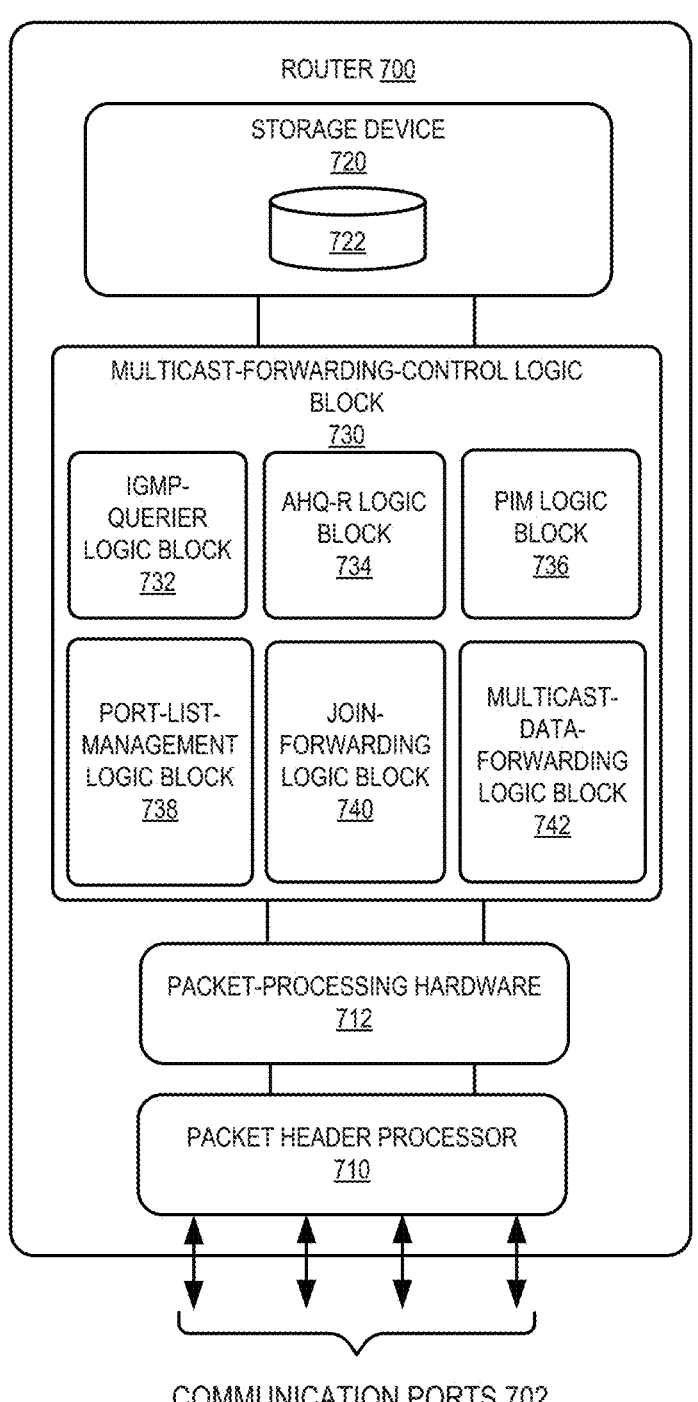
FIG. 7A illustrates an example of a router that facilitates selective multicast traffic forwarding at coupled layer-2 switches, according to one aspect of the present application.

FIG. 7A illustrates an example of a router that facilitates selective multicast traffic forwarding at coupled layer-2 switches, according to one aspect of the present application. In this example, a router 700 can include a number of communication ports 702, a packet header processor 710, and a storage device 720. Router 700 can also include packet-processing hardware 730 (such as its application-specific integrated circuit (ASIC) chips). Packet header processor 710 can perform the standard packet-processing function by extracting and processing header information from the received packets.

Communication ports 702 can include IP ports and Ethernet ports. Packet header processor 710 can process IP packets and Ethernet frames. A respective port of communication ports 702 may operate as an ingress port and/or an egress port.

Router 700 can maintain a database 722 (e.g., in storage device 720). Database 722 can be a relational database and may run on one or more Database Management System (DBMS) instances. Database 722 can store information associated with the routing, configuration, and interfaces of router 700. According to some aspects, database 722 can maintain first and second port lists, with the first port list specifying a first subset of communication ports 702 coupled to IGMP-enabled devices and the second port list specifying a second subset of communication ports 702 coupled to PIM-enabled routers. Router 700 can include a multicast-forwarding-control logic block 730 that can facilitate the selective forwarding of multicast traffic not only at router 700 but also at a coupled IGMP-enabled switch.

Multicast-forwarding-control logic block 730 can include an IGMP-querier logic block 732, an AHQ-R logic block 734, a PIM logic block 736, a port-list-management logic block 738, a join-forwarding logic block 740, and a multicast-data-forwarding logic block 742. IGMP-querier logic block 732 can handle standard IGMP querier functions, such as broadcasting AHQ packets to the network. AHQ-R logic block 734 can be responsible for tracking AHQ-R messages received from IGMP-enabled devices. PIM logic block 736 can handle standard PIM functions, such as sending and receiving PIM Hello messages. If router 700 is elected as a DR, PIM logic block 736 can also perform the DR functions, such as sending register messages to the RP. Port-list-management logic block 738 can manage two port lists, a first port list specifying a subset of communication ports 702 coupled to IGMP-enabled devices and a second port list specifying a second subset of communication ports 702 coupled to PIM-enabled routers. Note that if router 700 is a DR, the second port list may be omitted. Join-forwarding logic block 740 can forward join messages received from client devices to ports on the first port list. Multicast-data-forwarding logic block 742 can forward multicast data packets to ports on the second port list, if and only if router 700 is not the DR in the VLAN.

Figure 7B:
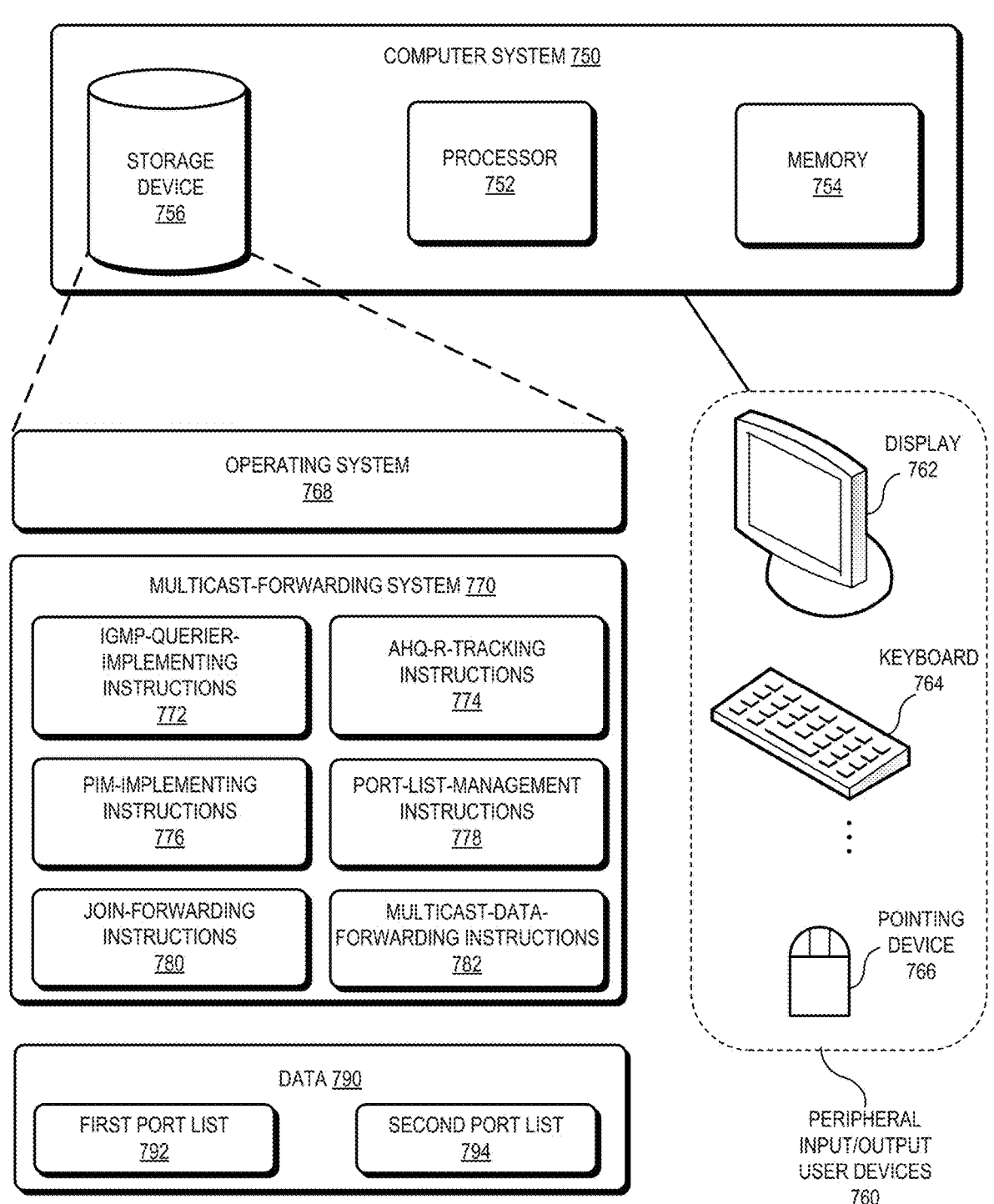
FIG. 7B illustrates an example of a computer system implemented on a querier device to facilitate selective multicast traffic forwarding, according to one aspect of the instant application.

FIG. 7B illustrates an example of a computer system implemented on a querier device to facilitate selective multicast traffic forwarding, according to one aspect of the instant application. Computer system 750 can include a processor 752, a memory 754, and a storage device 756. Furthermore, computer system 750 can be coupled to peripheral input/output (I/O) user devices 760, e.g., a display device 762, a keyboard 764, and a pointing device 766. Storage device 756 can store an operating system 768, a multicast-forwarding system 770, and data 790. According to some aspects, computer system 750 can be embodied as various function blocks included in an L3 router or an L2 switch.

Multicast-forwarding system 770 can include instructions, which when executed by computer system 750, can cause computer system 750 or processor 752 to perform methods and/or processes described in this disclosure. Specifically, by executing these instructions, computer system 750 can achieve the goal of reducing bandwidth consumption on inter-switch or inter-router links by selectively forwarding multicast data packets to switch/router ports. Multicast-forwarding system 770 can include instructions for performing standard IGMP querier functions (IGMP-querier-implementing instructions 772), instructions for tracking AHR-R packets received from IGMP-enabled devices (AHQ-R-tracking instructions 774), instructions for performing standard PIM functions (PIM-implementing instructions 776), instructions for managing a first port list specifying ports coupled to IGMP-enabled devices and a second port list specifying ports coupled to other PIM routers (port-list-management instructions 778), instructions for forwarding join packets to ports on the first port list (join-forwarding instructions 780), and instructions for forwarding the multicast data packets to other PIM routers (multicast-data-forwarding instructions 782). Data 790 includes a first port list 792 and a second port list 794.

In the examples shown in FIG. 6A-7B, the L2 switch and the L3 router are shown as separate entities. In practice, it is also possible to integrate an L2 switch and an L3 router into a single device capable of performing both the L3 routing and the L2 switching functions. Note that this disclosure uses IGMP as an example of the multicast protocol. The same solution can be implemented in systems adopting other types of multicast protocols, such as MLD.

In general, the disclosure describes a multicast data forwarding scheme that can reduce the bandwidth consumption on inter-switch and inter-router links. More specifically, instead of unconditionally flooding multicast data packets to the querier as specified by the conventional IGMP protocol, each IGMP-enabled device can selectively forward multicast data packets to the querier. To implement the solution, each IGMP-enabled device can respond to an AHQ packet from the querier with an AHQ-R packet to allow the querier to learn a list of ports coupled to other non-querier devices. The querier router can forward IGMP join messages received from client devices to the AHR-R receiving ports to allow each coupled IGMP-enabled device to determine whether a remote client is requesting multicast data for a particular group. When an IGMP-coupled device receives unknown multicast data packets, it can forward the data packets to the querier (via the QDP) if and only if a join message for the corresponding multicast group is received from the querier (i.e., received at the QDP). In addition, by snooping on the PIM Hello messages, the querier learns a list of ports coupled to other PIM-enabled L3 routers. If and only if the querier is not a DR on the VLAN, the querier would forward unknown multicast data packets to the PIM-enabled routers to ensure that the DR can receive the multicast data packets and register the source with the RP router.

One aspect of the instant application can provide a system and method for selective data forwarding in a multicast network. During operation, a querier router in the multicast network receives, at a first port of, a query-response packet from a network device in response to an all-host query sent by the querier router and can add the first port to a port list comprising a number of ports coupled to non-querier devices in the multicast network. In response to receiving a multicast-join message, the querier router can forward the multicast-join message to the ports on the port list comprising the first port except for a port that receives the multicast-join message. Forwarding the multicast-join message to the first port can cause the multicast-join message to be received at a second port of a layer-2 switch, which allows the layer-2 switch to forward unknown multicast data packets to the querier device via the second port.

In a variation on this aspect, the network device can enable Internet Group Management Protocol (IGMP), and the query-response packet can include a modified IGMP membership report packet.

In a further variation, the modified IGMP membership report packet can include a number of type-length-value (TLV) segments, with each TLV segment having non-operative type and length fields.

In a variation on this aspect, the querier device can snoop on advertising messages sent by other multicast-enabled routers in the multicast network to identify each port on the querier router that is coupled to a multicast-enabled router.

In a further variation, the querier router can add a port that is coupled to a multicast-enabled router to a second port list comprising a number of ports coupled to multicast-enabled routers.

In a further variation, in response to determining that the querier router is not a designated router, the querier router can forward the unknown multicast data packets to the ports on the second port list.

In a further variation, in response to determining that the querier router is a designated router, the querier router can suppress flooding of the unknown multicast data packets to the ports on the second port list.

In a further variation, the advertising messages can include Protocol Independent Multicast (PIM) Hello messages.

One aspect can provide a system and method for selective data forwarding in a multicast network. During operation, a layer-2 switch in a multicast network can receive, at a first port of, an all-host query from a querier router. In response to the all-host query, the layer-2 switch can send a query-response message from the first port to a second port of the querier router, causing the querier router to add the second port to a port list comprising a number of ports coupled to non-querier devices in the multicast network and forward any received multicast-join message to all ports on the port list comprising the second port. The layer-2 switch can receive unknown multicast data packets and determine whether a multicast-join message is received at the first port. In response to determining that the multicast-join message is not received at the first port, the layer-2 switch can suppress flooding of the unknown multicast data packets to the first port.

In a variation on this aspect, the layer-2 switch can forward the unknown multicast data packets to the querier router via the first port, in response to determining that the multicast-join message is received at the first port.

In a variation on this aspect, the layer-2 switch can enable Internet Group Management Protocol (IGMP), and the query-response packet can include a modified IGMP membership report packet.

In a further variation, the modified IGMP membership report packet can include a number of type-length-value (TLV) segments, with each TLV segment having non-operative type and length fields.

One aspect can provide a multicast network. The network can include a querier router comprising a first port and a layer-2 switch comprising a second port coupled to the first port of the querier router. The layer-2 switch is to send a query-response message to the first port of the querier router in response to receiving an all-host query from the querier router at the second port. The querier router is to add the first port to a port list comprising a number of ports coupled to non-querier devices in the multicast network and forward any received multicast-join message to the ports on the port list comprising the first port except for a port that receives the multicast-join message. The layer-2 switch is further to receive unknown multicast data packets, determine whether a multicast-join message is received at the second port, and suppress flooding of the unknown multicast data packets to the second port, in response to determining that the multicast-join message is not received at the second port.

The above description is presented to enable any person skilled in art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be, for example, Random Access Memory (RAM), non-volatile RAM (NVRAM), an Electrically Erasable Programmable Read-Only Memory (EEPROM), a storage device, an optical disc, and the like. The computer-readable storage medium may be a non-transitory storage medium, where the term "non-transitory" does not encompass transitory propagating signals.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
receiving, at a first port of a querier router in a multicast network, a query-response packet from a network device in response to an all-host query sent by the querier router;
adding, by the querier router, the first port to a port list comprising a number of ports coupled to non-querier devices in the multicast network; and
in response to receiving a multicast-join message, forwarding, by the querier router, the multicast-join message to the ports on the port list comprising the first port except for a port that receives the multicast-join message;
wherein forwarding the multicast-join message to the first port causes the multicast-join message to be received at a second port of a layer-2 switch,
which allows the layer-2 switch to forward unknown multicast data packets to the querier device via the second port.

2. The method of claim 1, wherein the network device enables Internet Group Management Protocol (IGMP), and wherein the query-response packet comprises a modified IGMP membership report packet.

3. The method of claim 2, wherein the modified IGMP membership report packet comprises a number of type-length-value (TLV) segments, with each TLV segment having type and length fields set as no operation.

4. The method of claim 1, further comprising: snooping on, by the querier device, advertising messages sent by other multicast-enabled routers in the multicast network to identify each port on the querier router that is coupled to a multicast-enabled router.

5. The method of claim 4, further comprising: adding, by the querier router, a port that is coupled to a multicast-enabled router to a second port list comprising a number of ports coupled to multicast-enabled routers.

6. The method of claim 5, further comprising: in response to determining that the querier router is not a designated router, forwarding, by the querier router, the unknown multicast data packets to the ports on the second port list.

7. The method of claim 5, further comprising: in response to determining that the querier router is a designated router, suppressing, by the querier router, flooding of the unknown multicast data packets to the ports on the second port list.

8. The method of claim 4, wherein the advertising messages include Protocol Independent Multicast (PIM) Hello messages.

9. A multicast network, comprising:
a querier router comprising a first port; and
a layer-2 switch comprising a second port coupled to the first port of the querier router;
wherein the layer-2 switch is to send a query-response message to the first port of the querier router in response to receiving an all-host query from the querier router at the second port;
wherein the querier router is to: add the first port to a port list comprising a number of ports coupled to non-querier devices in the multicast network; and
forward any received multicast-join message to the ports on the port list comprising the first port except for a port that receives the multicast-join message; and
wherein the layer-2 switch is further to: receive unknown multicast data packets; determine whether a multicast-join message is received at the second port; and
suppress flooding of the unknown multicast data packets to the second port, in response to determining that the multicast-join message is not received at the second port.

10. The multicast network of claim 9, wherein the layer-2 switch is
to forward the unknown multicast data packets to the querier router via the second port, in response to determining that the multicast-join message is received at the second port.

11. The multicast network of claim 9, wherein the querier router is to snoop on advertising messages sent by other multicast-enabled routers to identify each port 2 on the querier router that is coupled to a multicast-enabled router.

12. The multicast network of claim 11, wherein the querier router is to add a port that is coupled to a multicast-enabled router to a second port list comprising a number of ports coupled to multicast-enabled routers.

13. The multicast network of claim 12, wherein the querier router is not a designated router and is to forward the unknown multicast data packets to the ports on the second port list.

14. The multicast network of claim 12, wherein the querier router is a designated router and is to suppress flooding of the unknown multicast data packets to the ports on the second port list.

15. The multicast network of claim 11, wherein the advertising messages include Protocol Independent Multicast (PIM) Hello messages.

16. The multicast network of claim 9, wherein the layer-2 switch enables Internet Group Management Protocol (IGMP), and wherein the query-response packet comprises a modified IGMP membership report packet.

* * * * *